Aug. 18, 1964

C. S. DAVIS, JR., ET AL 3,144,790

GEAR TYPE TRANSMISSIONS

Filed April 13, 1961

INVENTORS
CHARLES S. DAVIS, JR.
BY STANLEY W. BAKER

Frank G. Bower

ATTORNEY

INVENTOR.
CHARLES S. DAVIS, JR.
BY STANLEY W. BAKER

ATTORNEY

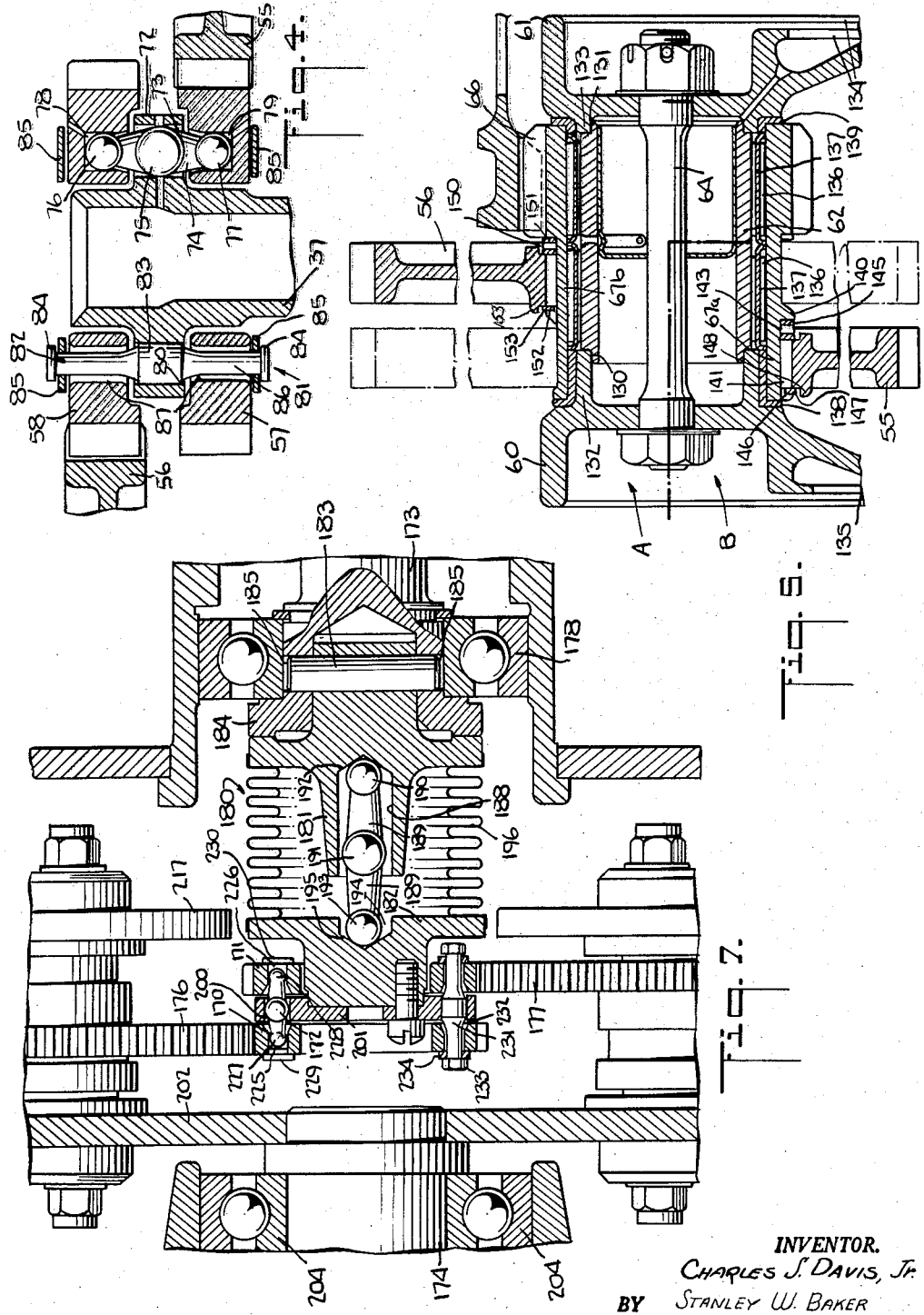

INVENTOR.
Charles S.Davis, Jr.
Stanley W. Baker
BY
Frank A. Bower
ATTORNEY

United States Patent Office 3,144,790
Patented Aug. 18, 1964

3,144,790
GEAR TYPE TRANSMISSIONS
Charles S. Davis, Jr., New York, N.Y., and Stanley W. Baker, Ramsey, N.J., assignors to Bergen Research Engineering Corporation, Teterboro, N.J., a corporation of New Jersey
Filed Apr. 13, 1961, Ser. No. 102,701
4 Claims. (Cl. 74—801)

This invention relates to gear type transmissions and is directed particularly to equalization or balancing of the transmission of torque between parallel torque transmitting mechanisms.

An object of the invention is to provide a gear type transmission having parallel power transmitting paths that has an even distribution of power transmission between the paths.

Another object of the invention is to provide a reduction of the rotating speed of an input shaft within a small space and without excessive gear tooth pressures.

Another object of the invention is to use planetary gear mechanism for reducing speed at low gear tooth pressures.

Another object of the invention is to reduce the speed of an input shaft to a low output speed by a small speed reducing transmission that is durable and dependable in service.

Other and further objects will be apparent from the following description taken in connection with the drawings in which—

FIG. 4 is an enlarged view of the mounting of the sun gears;

FIG. 5 is a composite sectional view of the two mountings for the respective sets of planetary gears taken along line 5a—5a of FIG. 2 for section portion A and line 5b—5b of FIG. 3 for section portion B;

FIG. 7 is an enlarged sectional view of the mounting of the sun gears of the embodiment of FIG. 6 taken in the same sectional plane.

Figure 1:
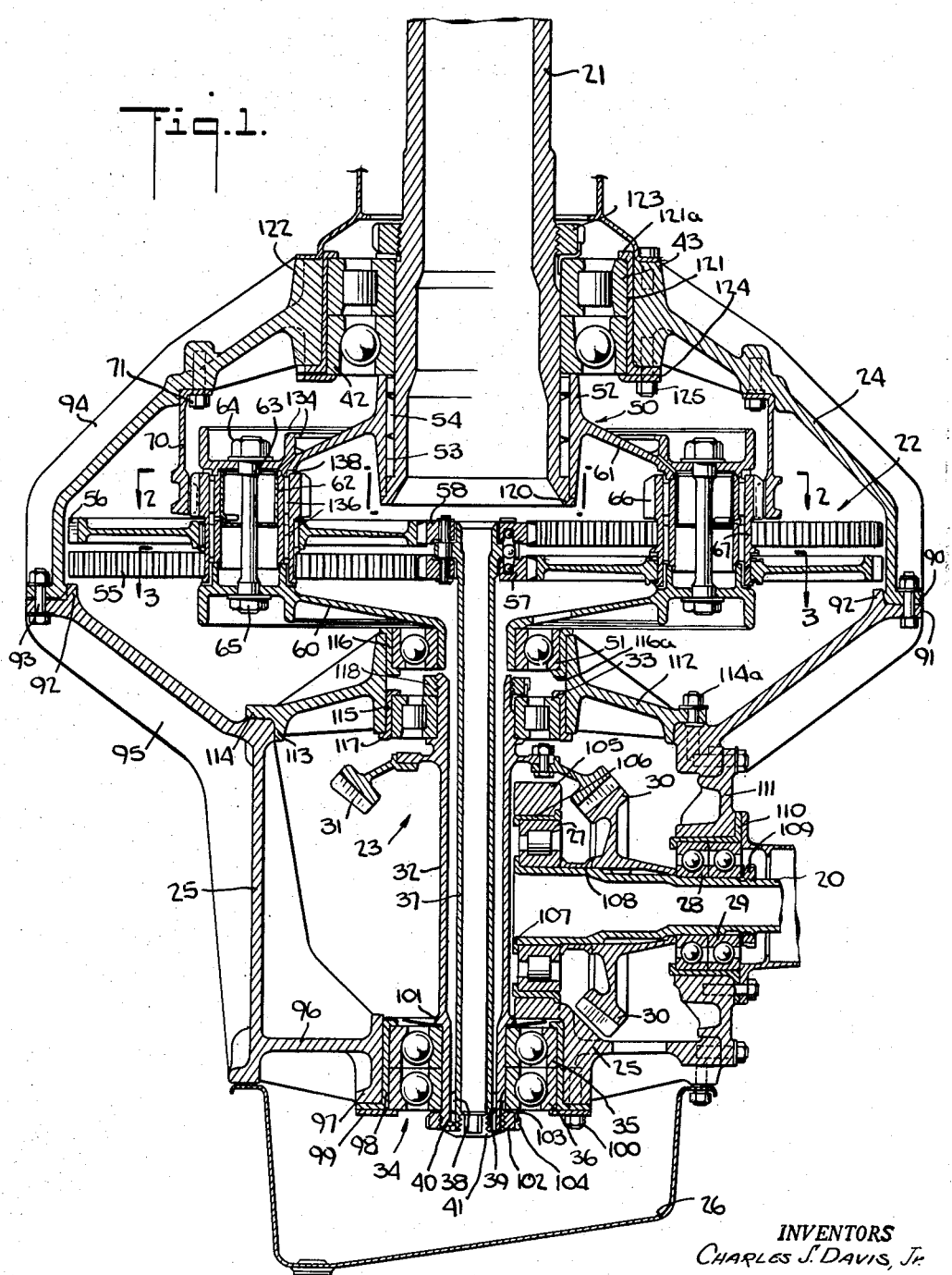
FIG. 1 is a sectional view through the central axis of the output shaft.
Figure 2:
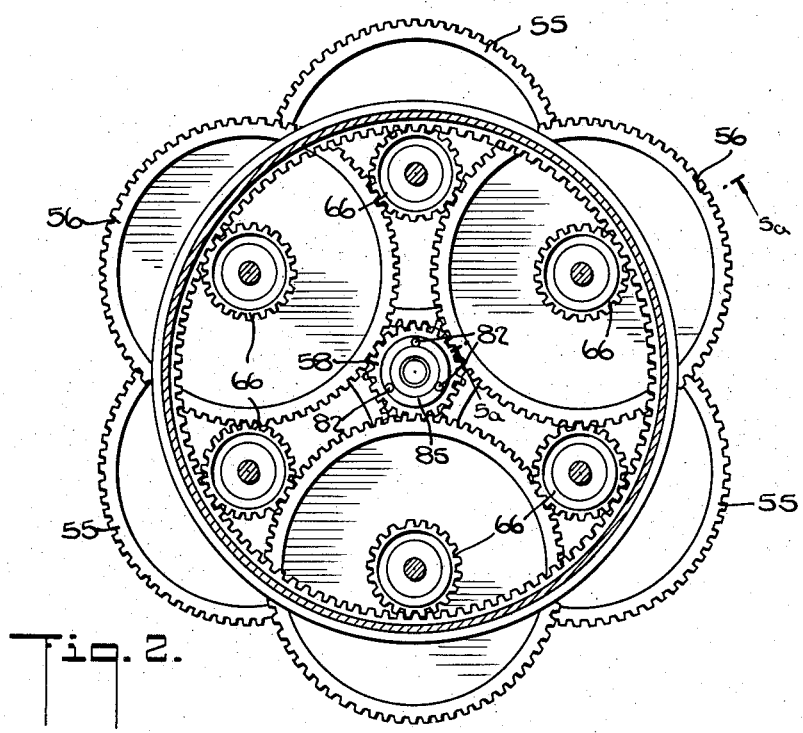
FIG. 2 is a sectional view of the planetary drive taken along line 2—2 of FIG. 1.
Figure 3:
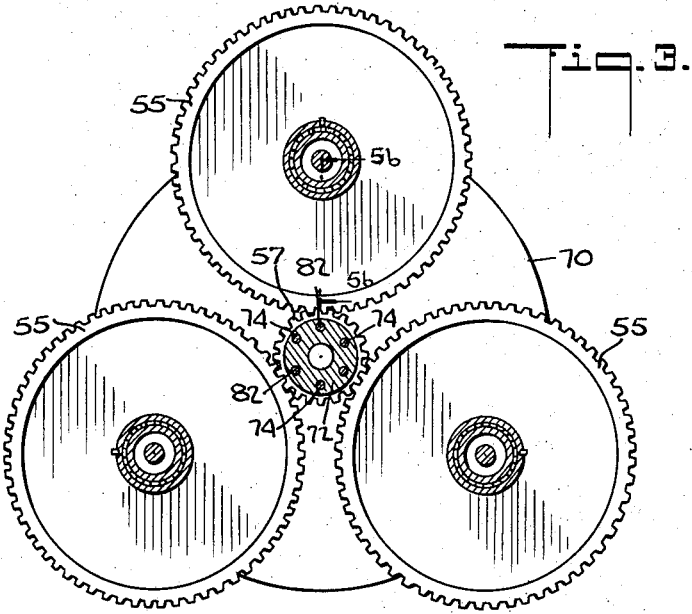
FIG. 3 is a sectional view of the planetary drive taken along line 3—3 of FIG. 1.

Referring to FIG. 1 of the drawings, the drive mechanism comprises an input shaft 20, and an output shaft 21. The output shaft is coupled to the input shaft by means of the planetary drive 22 and an intermediate drive 23 coupling the planetary drive to the input shaft 20.

The drive mechanism is supported with the output shaft 21 extending vertically and the input shaft 20 extending horizontally by means of the upper casing 24 and the lower casing 25. An oil reservoir pan 26 is attached below the casing 25. The input shaft is supported in the bearings 27 and the bearings 28 and 29. A beveled gear 30 is mounted between the bearing 27 and the bearing support formed by the bearings 28 and 29. The beveled gear 30 meshes with the beveled gear 31 mounted on the tubular shaft 32.

The tubular shaft 32 is mounted at its upper end in the bearing 33 and at its lower end in the double bearing 34 formed by the ball bearings 35, 36. A second tubular shaft 37 is telescopically fitted in the tubular shaft 32 and is rotatably coupled thereto by the keys 38, 39 and fastened axially by means of the retaining ring 40 and the threaded member 41. The keys 38, 39 also radially and flexibly support the shaft at this end spaced from the planetary drive 22. The shaft is flexibly supported at the other end by the planetary drive 22.

The planetary drive is coupled to the output shaft 21 through the planet gear carrier 50. The output shaft is rotatably supported by the ball bearing 42 and the roller bearing 43 and in the bearing 51 through the carrier 50 of the planetary drive.

Similarly, the carrier 50 of the planetary drive 22 is rotatably mounted in the bearing 51 on one side of the planetary drive and rotatably supported by and coupled to the output shaft on the other side of the planetary drive by means of the cylindrical member 52 and the keys 53, 54. On the output side the carrier is rotatably supported in the bearings 42 and 43 supporting the output shaft. The carrier is concentrically mounted in an adjustable relation to the tubular shaft 37 and axially aligned with the output shaft 21. Two sets of planet gears 55, 56 are rotatably mounted on the carrier 50. The gears 55 engage a sun gear 57 and the gears 56 engage a sun gear 58. The two gears 57 and 58 are flexibly mounted and coupled to the tubular shaft 37. The sun gear 57 and the planet gears 55 and the sun gear 58 and the planet gears 56 form two parallel paths for transmitting the drive torque from the shaft 37 to the carrier 50 and thence to the output shaft 21.

The carrier comprises two web members 60 and 61 with six cylindrical journal members 62 positioned between the web members 60, 61 which are held together by the fastening means 63 comprising a bolt 64 and a nut 65.

Rotatably mounted on the cylindrical journal members 62 are gears 66 with hubs 67a, 67b as best illustrated in FIG. 5. The planet gears 55 and 56 are mounted on the hubs 67a, 67b. There are three gears in each set of the planet gears 55, 56 with the gears of each set alternately mounted on the hubs 67a, 67b.

An orbit gear 70 is rigidly fastened to the casing 24 by means of the threaded member 71. The gears 66 engage the orbit gear 70 to rotate the carrier on the application of a driving torque to the planetary drive.

As illustrated in FIG. 4 the shaft 37 has a radial flange 72 with three openings 73. Torque transmitting beams 74 are rotatably mounted in the openings 73. The beams 74 have a limited universal movement in relation to the flange 72 so that the ends of the beam may shift circumferentially or radially through limited arcs. Each beam 74 has a ball shaped portion 75 fitting snugly in the opening 73. On the ends of each beam are ball portions 76 and 77. The ball portions 76 fit into sockets 78 in the gear 58 and into sockets 79 in the gear 57 to permit the ball portions 76 and 77 to rotate in relation to the sun gears 57 and 58 respectively. The beams 74 form the sole means for supporting the sun gears 57 and 58 on the end of the shaft 37 and permit the gears 57 to rotate circumferentially and shift radially in relation to the shaft 37. The flexible pivotal mounting of the long shaft 37 at one end and the flexible mounting at the other end in the sun gears 57, 58 provides the shaft with a low lateral spring rate to respond to the forces of the gears.

Three openings 80 are formed in the flange 72 and interfitted between the openings 73, each to receive a fastening means 81 comprising a pin 82 having a cylindrical member 83 fitting in the opening 80. End flanges 84 engage two retaining rings 85 positioned between the sun gears 57 and 58 respectively and the flanges 84 for retaining the sun gears 57, 58 on the end of the beams 74.

The pins 82 have reduced portions 86 passing through the openings 87 in the sun gears 57, 58 so as not to interfere with the limited circumferential and radial movement of the sun gears 57, 58. The sun gear 57 meshes with the three planet gears 55 spaced at 120 degrees to one another, and the sun gear 58 meshes with the planet gears 56 also spaced at 120 degrees with one another. The planet gears 55 and the planet gears 56 form part of the means for positioning the respective sun gears 57 and 58 and the end of the shaft 37.

The driving torque is transmitted through the shaft 37, the three beams 74 to the sun gears 57 and 58 and thence to the planet gears 55, 56 and the carrier 50. By solely supporting the gears 57, 58 by means of the beams 74 the torque is automatically evenly distributed between the sun gear 57 and the sun gear 58. The limited universal movement of the beams 74 permits the sun gears to shift circumferentially in relation to one another and to shift radially to accommodate and distribute the load on the faces of the engaging teeth of the sun gear 57 and the three planet gears 55 and the sun gear 58 and the three planet gears 56.

In this embodiment the sun gears have a smaller diameter than the planet gears. The ratio is approximately 3 to 1. The carrier has a ratio of approximately 4 to 1 to the sun gears, and the orbit gear has a ratio of slightly greater than 5 to 1 in relation to the sun gear. The beveled gears 30 and 31 are in a 1 to 1 relation. Thus the overall speed reduction between the input shaft 20 and the output shaft 21 is approximately 18 to 1.

Considering in greater detail the stationary members of the drive, the casing 24 has a flange 90 and the casing 25 has a flange 91 with an inner axial flange 92. The flange 90 of the casing 24 is nested in the flanges 91 and 92 of the casing 25 and fastened by means of the nut and bolt 93. The casing members 24 and 25 are thus formed into a unitary member so as not to shift radially or axially in relation to one another. Strengthening ribs 94 are provided on the casing 24 and strengthening ribs 95 are provided on the casing 25. The casing 25 has a solid bottom member 96 with a cylindrical bearing supporting member 97 extending axially to the shafts 32 and 37. Sleeve 98 is fitted in the cylindrical member 97 for supporting the bearings 35 and 36. The sleeve and bearings are held in place by the ring member 99 and the nut and stud 100 threaded into the cylindrical member 97. The shaft 32 has a circular rib 101 against which the bearing 35 is seated. Thus the bearings 35 and 36 are firmly supported in the casing 25 to rotatably support the shaft 32 and receive any axial force through the circular rib 101. A nut 102 is threaded on the end of the shaft 32 with a key 103 fitted in the slot 104 for preventing the rotation of nut 102 on the shaft 32.

The bearing 27 is mounted in the ring support 105 which is cast as part of the casing 25. A fitting sleeve 106 is provided for receiving the bearing 27 to position the bearing 27. The shaft 20 has a flange 107 which also holds the bearing 27 on the inner end. A collar 108 is positioned on the opposite side from the flange 107 which bears against the hub of the gear 30. The gear 30 bears against the bearings 28 and 29 which are held in place by the nut 109 threaded on the input shaft 20. Thus the nut 109 holds the bearing 27, collar 108, bevel gear 30 and the bearings 28 and 29 on the shaft 20. Bearings 28 and 29 are also positioned in the sleeve 110. The casing 25 has a plate 111 fastened thereto for supporting the bearings 28 and 29 in the sleeve 110.

The bearings 33 and 51 are supported in the plate 112 having flanges 113 and 114 bearing against the casing 25 to position and support the plate 112. Suitable fastening means 114a are provided for securing the plate 112 to the casing. Thus the plate is held axially and radially firmly in position. Sleeve members 115, 116 are provided to properly position the bearings 33 and 51 respectively in relation to the axis of the output shaft 21. The bearing 33 is held in position on the shaft 32 by means of the circular rib 117 on one side and the nut 118 threaded on the end of the shaft 32 on the other side. The bearing 51 is held in position by means of the flange 116a on the sleeve 116 and on the other side by the web member 60 of the carrier 50. The bearings 42 and 43 are held in position on the cylindrical supporting member 122 by the flange 121a of the sleeve 121 and the ring member 124 both fastened to the member 122 by the fastening means 125 located at circumferentially spaced points around the member 122. Thus a downward axial force on the shaft 21 is transmitted through the nut 123, bearing 43 to the ring member 124 fastened to the cylindrical member 122 by means of suitable fastening means 125. The upward axial force of the shaft 21 is transmitted to the casing 24 by means of the radial end flange 120 on the lower end of the input shaft 21, the cylindrical member 52 and the bearing 43 to the sleeve 121 and the cylindrical supporting member 122 of the casing 24.

Thus the shaft 37 and the planetary drive 22 are relieved of any radial forces and are permitted to respond solely to the torque transmitted by the drive, the shaft 37 radially flexible and being adjustably mounted at one end by the keys 38, 39 and at the other end in the sun gears 57 and 58, and the adjustable mounting of the sun gears 57 and 58 on the beams 74 thus makes the combination of the shaft 37 and the sun gears 57, 58 responsive to the torque to distribute the torque evenly between the planet gears 55 and 56. This permits the parallel distribution of the torque between two sets of planet gears thereby substantially increasing the size of the planet gears and the area of the surface of the teeth for the transmission of forces between the sun gears and the planet gears. Thus within a single drive transmission a substantial torque may be carried by the speed reduction members without excessive tooth pressures occurring. Further, the maximum tooth pressures can be determined and limited due to the balancing action of the beams 74 and the shaft 37. Neither the sun gear 57 nor the sun gear 58 can assume more or less than its full share of the torque transmitted by the transmission.

Considering in greater detail the carrier 50 and the mounting of the planet gears 55 and 56 thereon, the cylindrical member 62 has outer grooves 130 and 131 on each end which fit into cylindrical bosses 132 and 133 in the members 61 and 60 respectively. When fastener 64 is preferably tightened the sleeves are rigidly held to form the carrier 50 with the members 60 and 61. Circular strengthening ribs 134 are provided on the member 61 and strengthening ribs 135 are provided on the member 60. The spur gear 66 is rotatably mounted on the sleeve 62 by the needle rollers 136 mounted in the cages 137. The gear 66 and the cages 137 are axially held in position by the ring bearing members 138, 139 mounted on the bosses 132, 133 of the members 61 and 60. The planet gears 55, 56 are mounted on the hubs 67 of the spur gear 66. The hub 67a supporting the planet gear 55 and the hub 67b supporting planet gear 56 have different means for mounting the planet gears. The hub 67a has an annular rib 140 spaced from the end of hub 67a and splines 141. An intermittent groove 143 spaces the splines from the rib. The planet gear is meshed with the splines. A marcel washer 145 fits in the groove 143. The gear 55 is pressed against the washer which compresses the washer. The splines have circumferential slots 146 for receiving a retaining ring 147. The marcel washer forces the gear axially so that the annular shoulder 148 overlaps the retaining ring to ensure its remaining in place. On the hub 67b the splines are circumferentially spaced and the gear 56 slides on the splines. The splines form a groove 150 with the gear for a marcel type washer 151. The splines have slots 152 for the retaining ring 153. A circumferential shoulder 154 is provided similar to 148 to overlap the retaining ring 153. The marcel washer 151 holds the gear 56 against the retaining ring.

Figure 6:
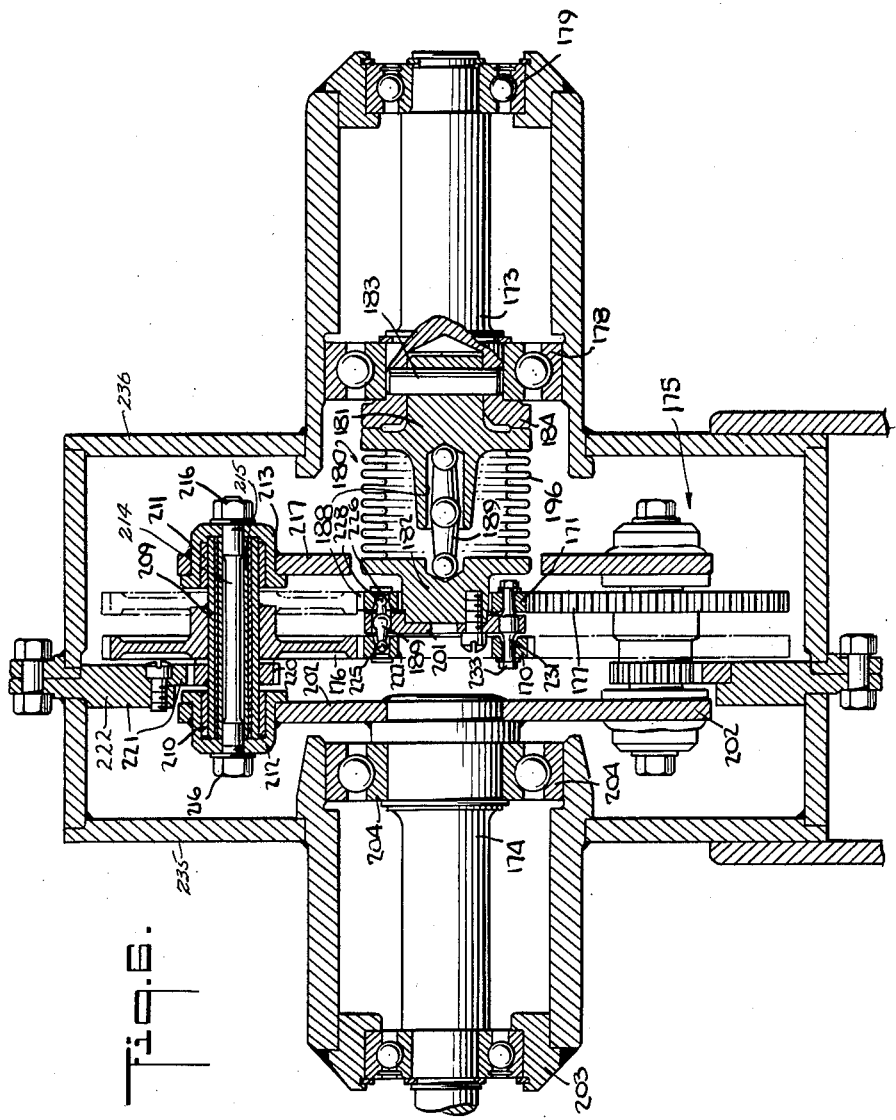
FIG. 6 is a sectional view of another embodiment taken through the central axis of the output shaft.

In FIGS. 6 and 7 another embodiment of the invention is illustrated. The sun gears 170, 171 are mounted on beam 172 so as to have the same type of circumferential and radial movement as the sun gears 57 and 58. The input shaft 173 is coupled to the output shaft 174 by means of the planetary drive 175 having parallel force transmitting paths through the sun gears 170 and 171 and the planet gears 176, 177. The input shaft 173 is rotatably supported in the bearings 178, 179 and has a flexible type of coupling 180 for connecting the shaft 173 to the sun gears 170, 171. The flexible coupling comprises a socket member 181 and a plate 182. The socket member 181 is fastened to the shaft 173 by a pin 183 fitting in the yoke portion 184 of the shaft 173. The yoke portion has two diametrically opposed opening means 185 axially aligned to receive the cylindrical pin 183. The socket member 181 has a cylindrical hole 188 with a conical bottom 192. The dumbbell shaped pin 189 fits in the hole 188 and the spherical ball portion 190 seats on the conical bottom 192. At the opposite end of the pin the spherical ball portion 193 seats on conical bottom 195 of the hole 194 in the plate 182. The plate 182 is held against the pin 189 by the tension forces of the corrugated member 196. The corrugated member 196 transmits the torque of the drive shaft 173 to the plate 182. The center spherical ball portion 191 is slightly spaced from the wall of the cylindrical hole 188 to permit a limited angular movement of the pin. The main purpose of the pin is to provide support for the plate 182 and the sun gears until the gears are in position on the planet gears and to hold the corrugated member under tension. The pin also maintains the axial position of the sun gears with relation to the shaft 173 and the planet gears 176, 177.

The torque is transmitted to the plate member 182 through the cylindrical corrugated member 196. The beams 172 are mounted in the openings 200 in the flange plate 201 attached to the member 182. The bellows or corrugated member 196 provides the necessary low lateral spring rate that is attained by the long shaft 37 and its flexible mounting at the end of the shaft 32 of the previous embodiment. The member 182 is supported by the planet gears 176 and 177.

The planet gears 176 and 177 are mounted on the carrier 202 rigidly fastened to the end of the output shaft 174. The output shaft is rotatably mounted in the bearings 203, 204. The carrier 202 has six sleeves 209 rotatably mounted in the bearings 210 and 211. The bearings are supported by the collars 212 and 213 respectively rigidly welded to the carrier 202. The collar 213 is secured to the carrier 202 by means of the shaft 214 extending through the sleeve 215 positioned between the collars 212 and 213. The nuts 216 are threaded on the end of the shaft 214 to rigidly press the collar 213 against the sleeve 215 for rigidly holding the collar 213 on the carrier 202. A carrier ring 217 is welded to each of the collars 213 to provide additional support rigidity to the carrier. A spur gear 220 and a respective planet gear 176 or 177 is fastened to the rotating sleeve 209. The spur gear 220 meshes with the fixed orbit gear 221 fastened to the frame by the ring shaped mounting member 222.

As in the previous embodiment there are three planet gears to each set with the planet gears of a given set circumferentially positioned at 120 degrees, thereby providing a three point support for the respective sun gears. The input shaft 173 is firmly mounted in the bearings 178 and 179. The low lateral spring rate is provided by the bellows of corrugated member 196. This provides for the radial adjustment of the sun gears 170 and 171 while the beams 172 provide for the limited circumferential adjustment and relative radial adjustment between the two sun gears. The sun gears 170 and 171 are somewhat different from the sun gears 57 and 58 in that the bores 225, 226 into which the ball portions 227 and 228 fit extend through the gears. Caps 229, 230 are provided to close the ends of the bore and provide a seating surface for the ball portions 227 and 228 so as to limit the axial or sidewise movement of the gears 170 and 171. The gears are also held together in a similar manner as sun gears 57, 58 by the pins 231 fitting in the openings 232 in the flange plate 201 with nuts 233 threaded on opposite ends and bearing against washers 234. The transmission is supported by a two piece casing comprising casing sections 235, 236 fastened together by suitable means.

In both of the foregoing embodiments the sun gears are held in position by the respective sets of planet gears. The gears are supported by the shaft 37 or the plate 182 to respond to the torques transmitted to the planet gears and to the pressures between the teeth of the sun gears and the planet gears so that excessive loads are not created and a possible maximum load can be predetermined and the gears correspondingly designed. The shaft 37 or plate 182 may flex or slightly deviate so as to shift both sun gears laterally to the axis of the output shaft. This provides equal distribution of the forces between the three planet gears supporting or meshing with a given sun gear. The limited universal action of the beams 74 or 189 provides for a radial of circumferential adjustment of the sun gears relative to one another to equally distribute the torque between the two sun gears. Although the sun gears are flexibly mounted on the driving shaft for the equal distribution of the torque they are held substantially in position and alignment with the output shaft by the planet gears with a slight compensation permitted by the lateral action of the driving shaft. This structure provides a planet gear having a large diameter and a smaller tooth area than would be permitted without this type of sun gear mounting. This permits a higher reduction in speed and a higher transmission in torque in a relatively small size transmission.

Various modifications may be made in the transmission and in the supporting of the sun gears without departing from the scope of the invention as set forth in the appended claims.

We claim:

1. A speed reducer comprising a torque transmitting shaft and an output shaft axially aligned therewith, a fixed orbit gear, a carrier mounted on said output shaft and rotating therewith, said carrier having six rotatable spur gears meshing with said orbit gear to rotate said carrier on application of torque thereto, three planet gears each mounted on a respective spur gear positioned 120 degrees to one another, a second set of three planet gears mounted on the three remaining spur gears at 120 degrees to one another, means for mounting said torque transmitting shaft to have an end deviating from the aligned axis on application of low radial pressures thereto, said end having a radial flange with three beams extending generally longitudinal to said torque transmitting shaft and on each side of said flange and having a limited universal movement relative to said flange, two sun gears mounted on opposite ends of said beams to move radially and circumferentially with respect to each other and said flange, one sun gear engaging one set of planet gears with the center of tooth contact in aligned relation with the end of the beam engaging said one sun gear and the other sun gear engaging the other set of planet gears with the center of tooth contact in aligned relation with the other end of the beam engaging said other sun gear to have the forces on each side of the flange balanced and to equalize the torque supplied between said sun gears and said respective planet gears.

2. A speed reducer comprising a torque transmitting shaft and an output shaft axially aligned, a fixed orbit gear, gear, a carrier mounted on said output shaft and rotating therewith, said carrier having six rotatable spur gears meshing with said orbit gear to rotate said carrier on application of torque thereto, three planet gears each mounted on a respective spur gear positioned 120 degrees to one another, a second set of three planet gears mounted on the three remaining spur gears at 120 degrees to one another, said torque transmitting shaft having a radial flange at one end, three beams extending generally longitudinal to said torque transmitting shaft mounted in said radial flange to have a limited universal movement, sun gears mounted on opposite ends of said beams and meshing with a respective set of planet gears with the center of tooth contact aligned with the end mounting on the respective beams so the gears move radially and circumferentially with respect to each other and said flange, and means for mounting said torque transmitting shaft with a low lateral spring rate to permit the adjustment of said sun gears to the torque applied by said shaft to equalize the torque supplied between said sun gears and said respective planet gears.

3. A planetary gear mechanism comprising a fixed orbit gear having a central axis, an output carrier mounted to rotate about the central axis, two sets of spur gears mounted on said carrier and revolving in a fixed circular path about the central axis and engaging the fixed orbit gear, two sets of planet gears mounted on the spur gears and rotating and revolving with the spur gears in a fixed circular path about the central axis, a torque transmitting shaft-like means mounted to rotate about the central axis and to have a portion slightly deviating radially therefrom under low radial pressures, supporting means on said portion, force transmitting means intermediately mounted on said supporting means, two sun gears mounted on said force transmitting means on opposite sides of said supporting means and meshing with a respective set of planet gears in a generally aligned relation to the position of a respective sun gear on the force transmitting means so that said sun gears shift radially with said shaft and move relatively circumferentially and radially with respect to one another to equalize the load and tooth pressures transmitted by said sun gears to said planet gears.

4. A transmission comprising an input shaft and an output shaft axially aligned therewith, a fixed orbit gear concentric to said output shaft, an output carrier mounted on said output shaft and having two sets of planet gears revolving in a fixed circular path about the output shaft on rotation of said carrier, said planet gears being operatively engaged by said orbit gear to rotate said carrier on application of torque to said planet gears, a gear mounting having a flange with three beams, a metallic bellows means for connecting said gear mounting to said input shaft and means for holding said bellows means in tension to render said gear mounting responsive to low radial pressures, two sun gears mounted on said gear mounting on opposite sides of said flange and on the ends of said beams in general alignment with said planet gears to move relatively circumferentially and radially with respect to one another and shift radially with respect to the axis of the output shaft and to respond to low radial pressures on transmission of torque to a respective set of planet gears to equalize the load and tooth pressures transmitted by said sun gears to said planet gears.

References Cited in the file of this patent
UNITED STATES PATENTS

| | | |
|---|---|---|
| 1,225,360 | Royce | May 8, 1917 |
| 1,437,913 | Schellens | Dec. 5, 1922 |
| 1,503,919 | Schmidt | Aug. 5, 1924 |
| 1,624,416 | MacFarland | Apr. 12, 1927 |
| 2,487,952 | Sznycer | Nov. 15, 1949 |
| 2,516,077 | Schmitter | July 18, 1950 |
| 2,700,311 | Bade | Jan. 25, 1955 |
| 2,749,778 | Kuhn | June 12, 1956 |
| 2,844,052 | Stoeckicht | July 22, 1958 |
| 3,021,731 | Stoeckicht | Feb. 20, 1962 |

FOREIGN PATENTS

| | | |
|---|---|---|
| 444,697 | Germany | May 24, 1927 |
| 958,710 | France | Sept. 19, 1949 |